Figure 1:
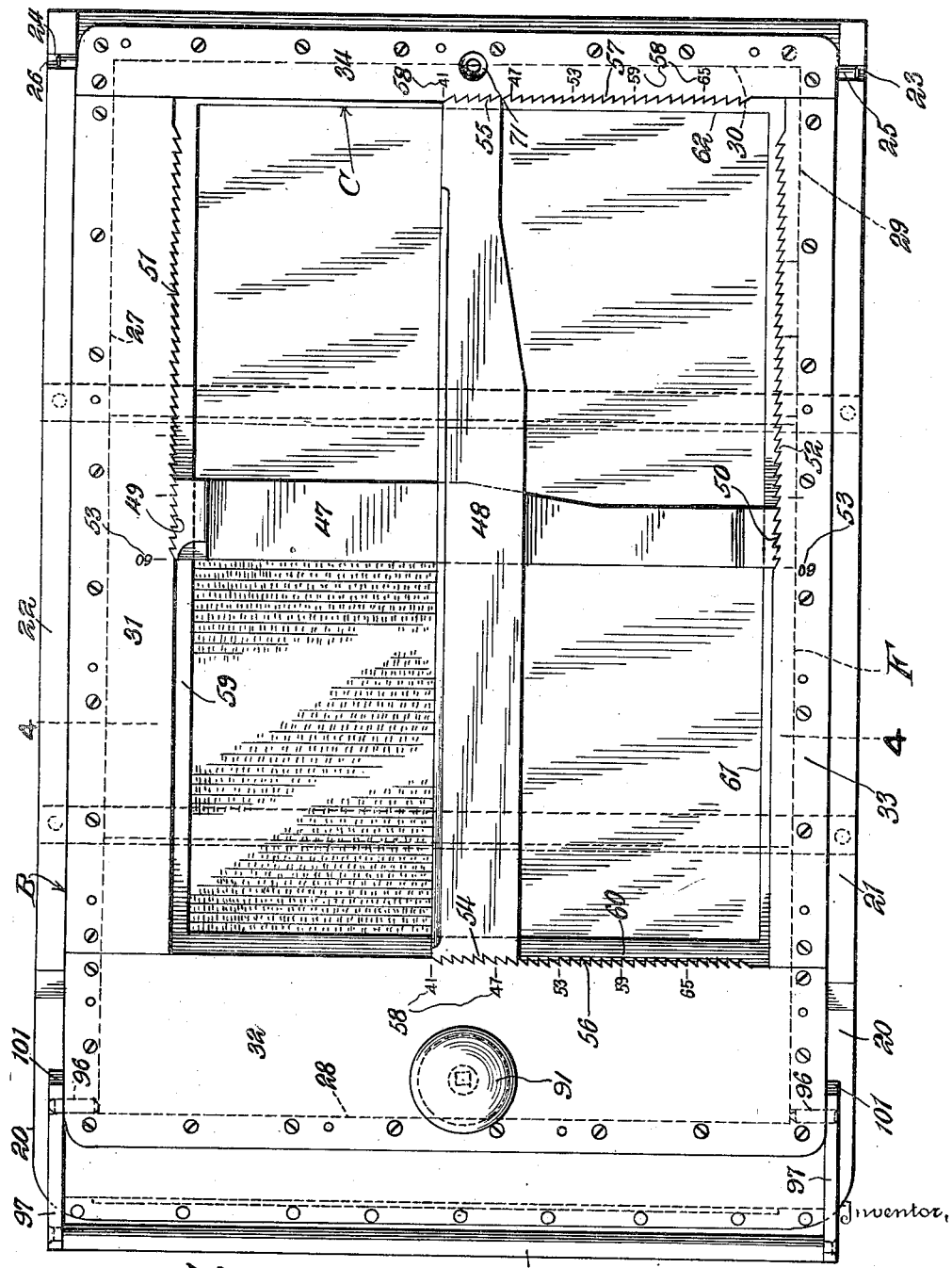

April 19, 1938.   H. R. TROTTER   2,114,946
MAKE-UP GAUGE
Filed July 26, 1937   6 Sheets-Sheet 1

Henry R. Trotter,
By Henry T. Bright

April 19, 1938.  H. R. TROTTER  2,114,946
MAKE-UP GAUGE
Filed July 26, 1937  6 Sheets-Sheet 2
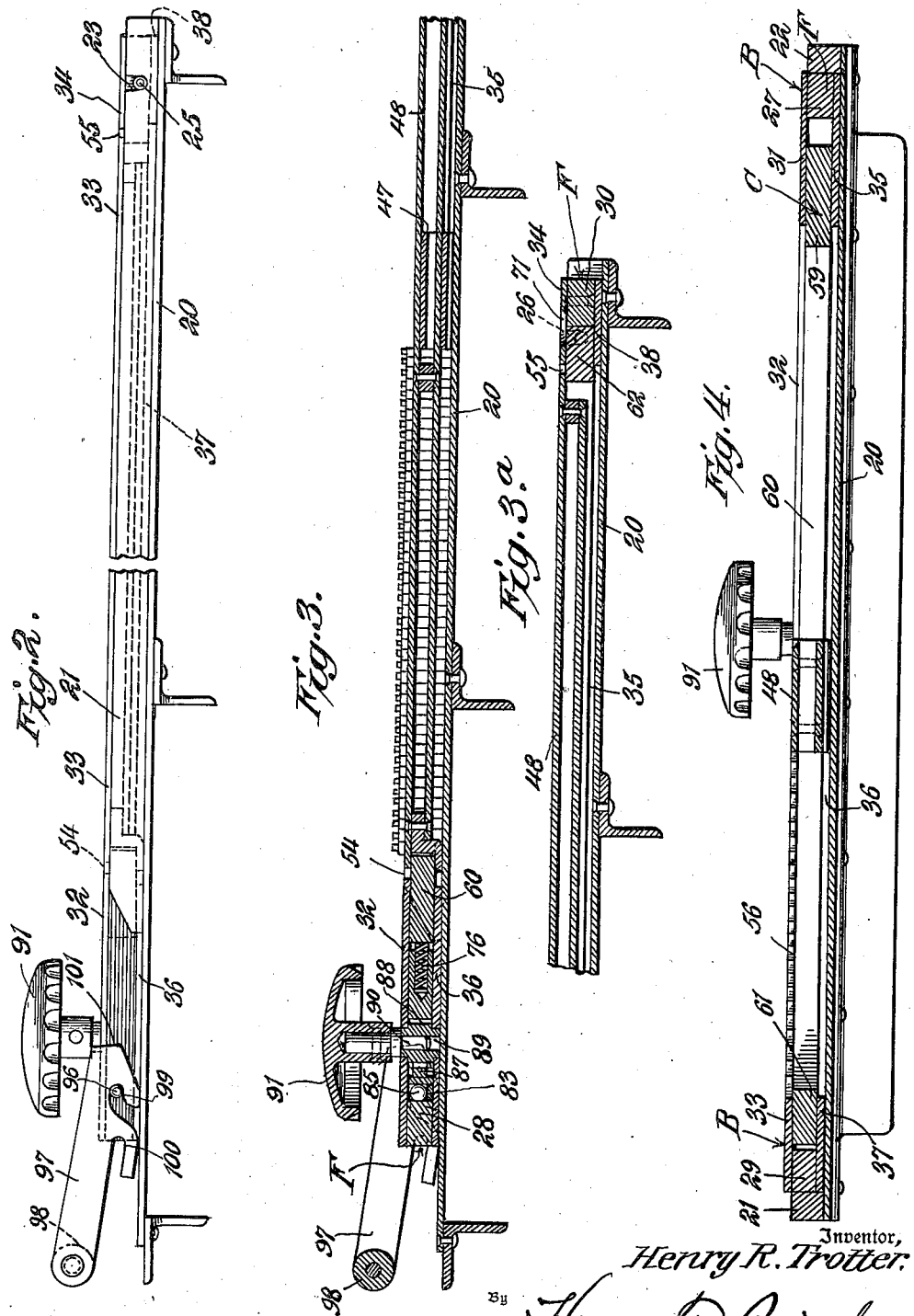
Inventor,
Henry R. Trotter.
By Henry T. Bright
Attorney

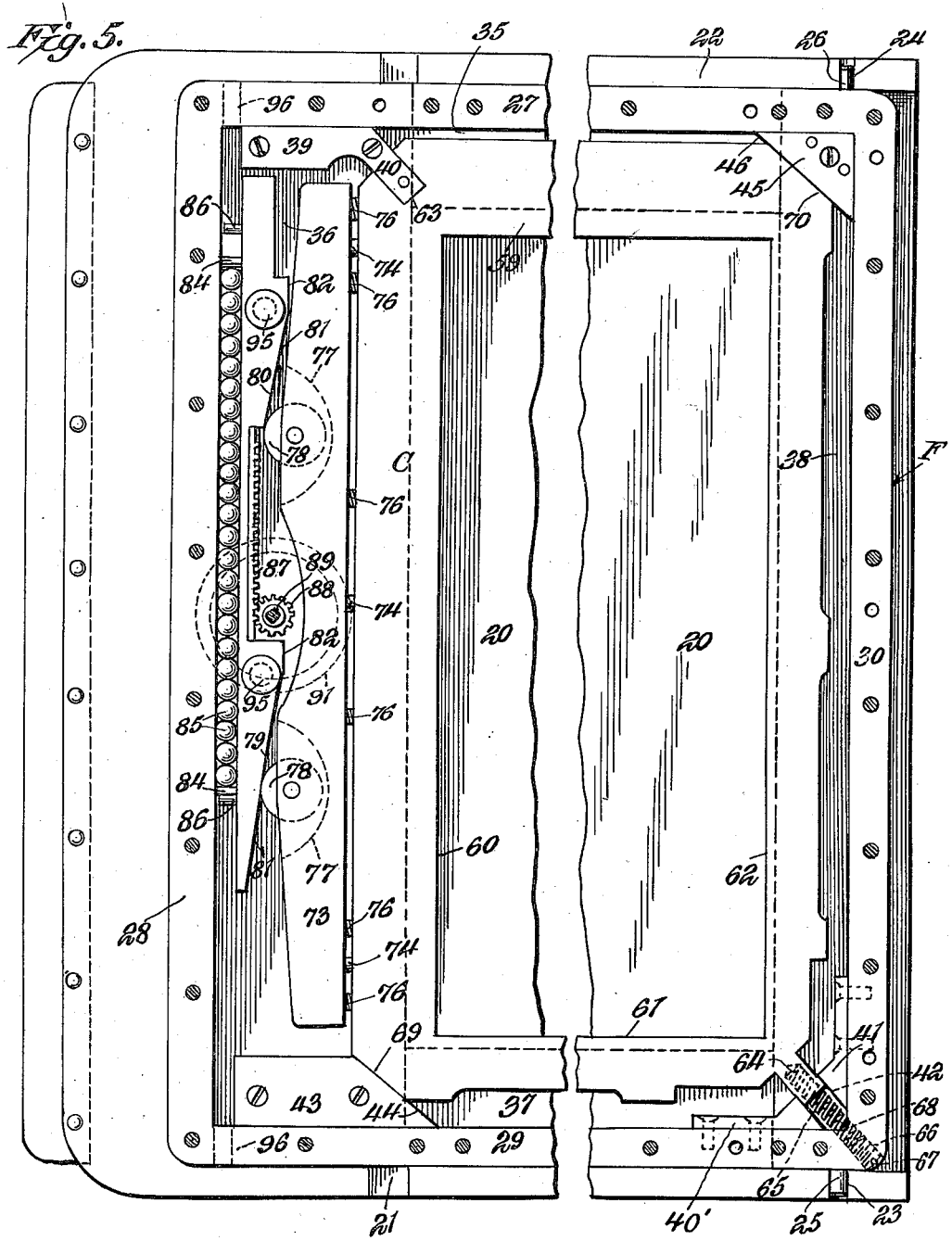

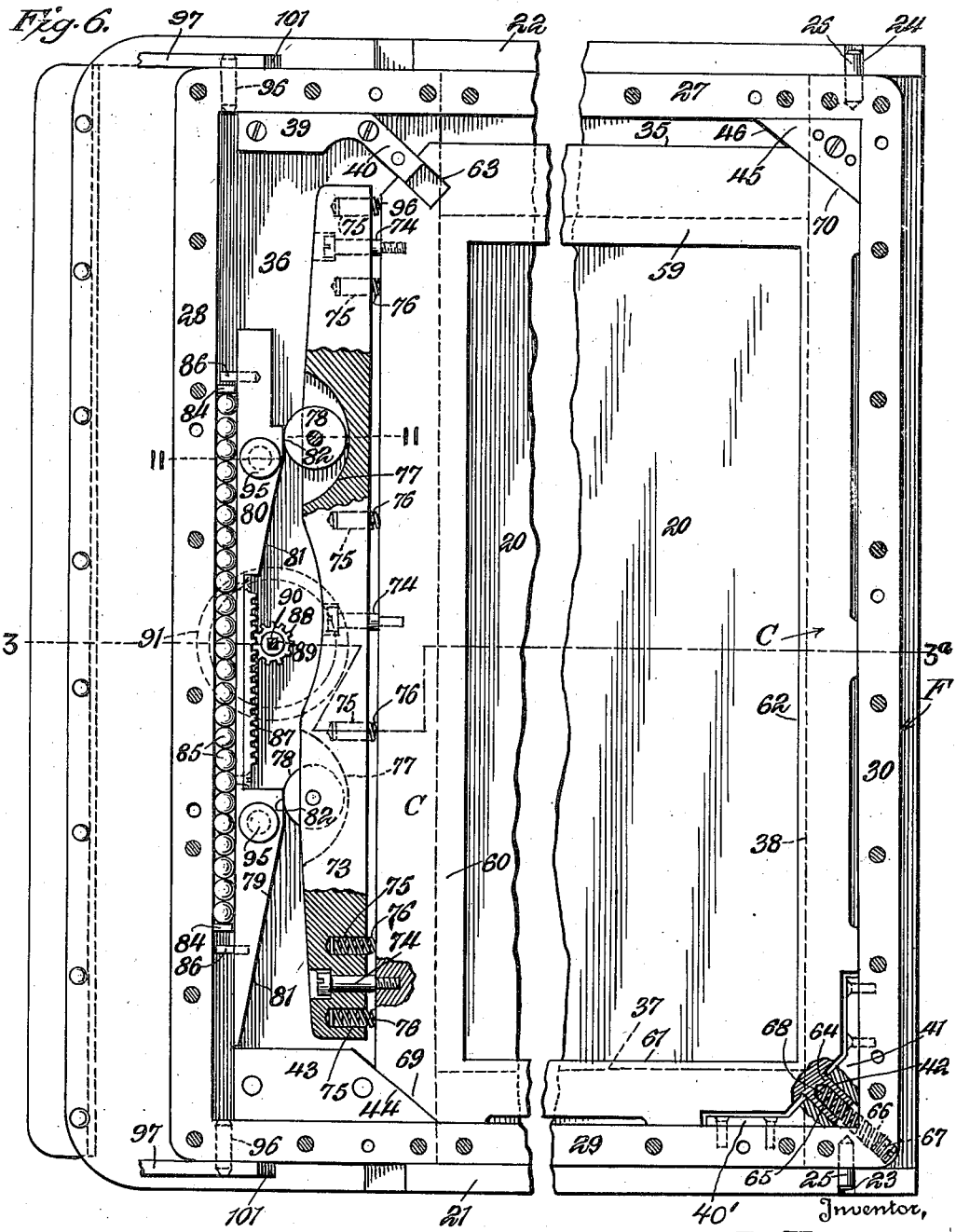

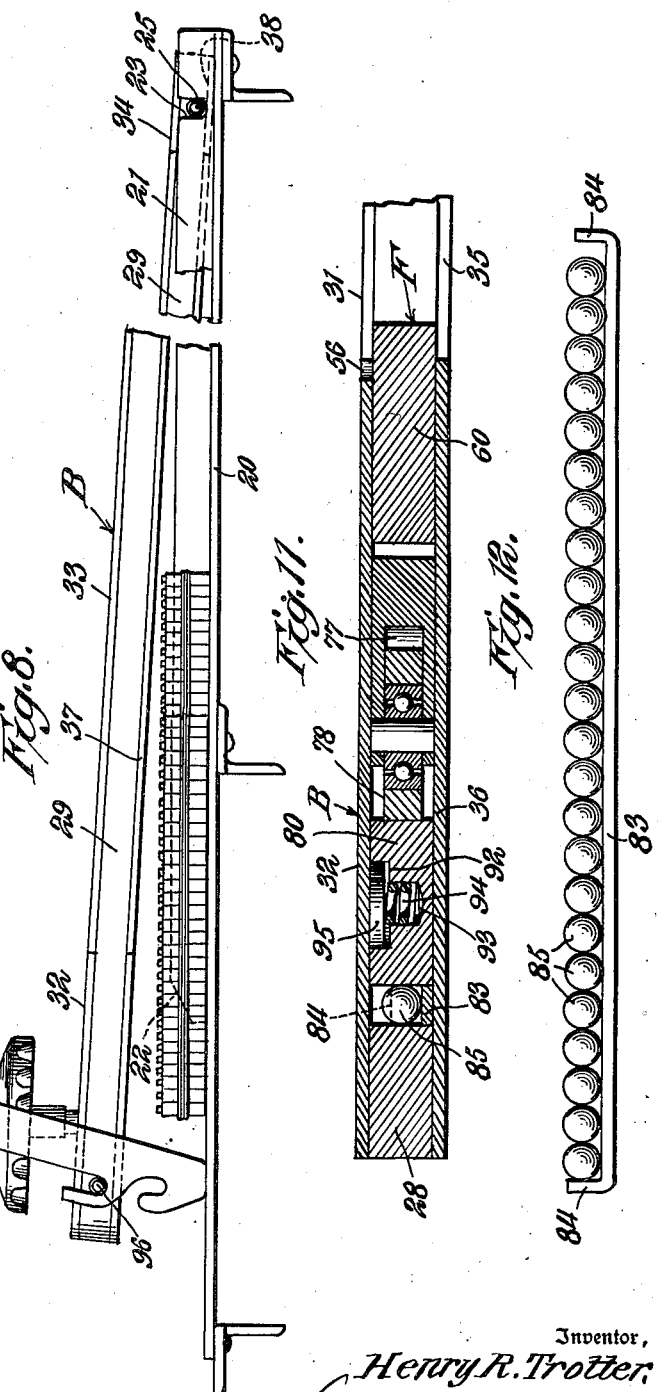

April 19, 1938. H. R. TROTTER 2,114,946
MAKE-UP GAUGE
Filed July 26, 1937 6 Sheets-Sheet 6
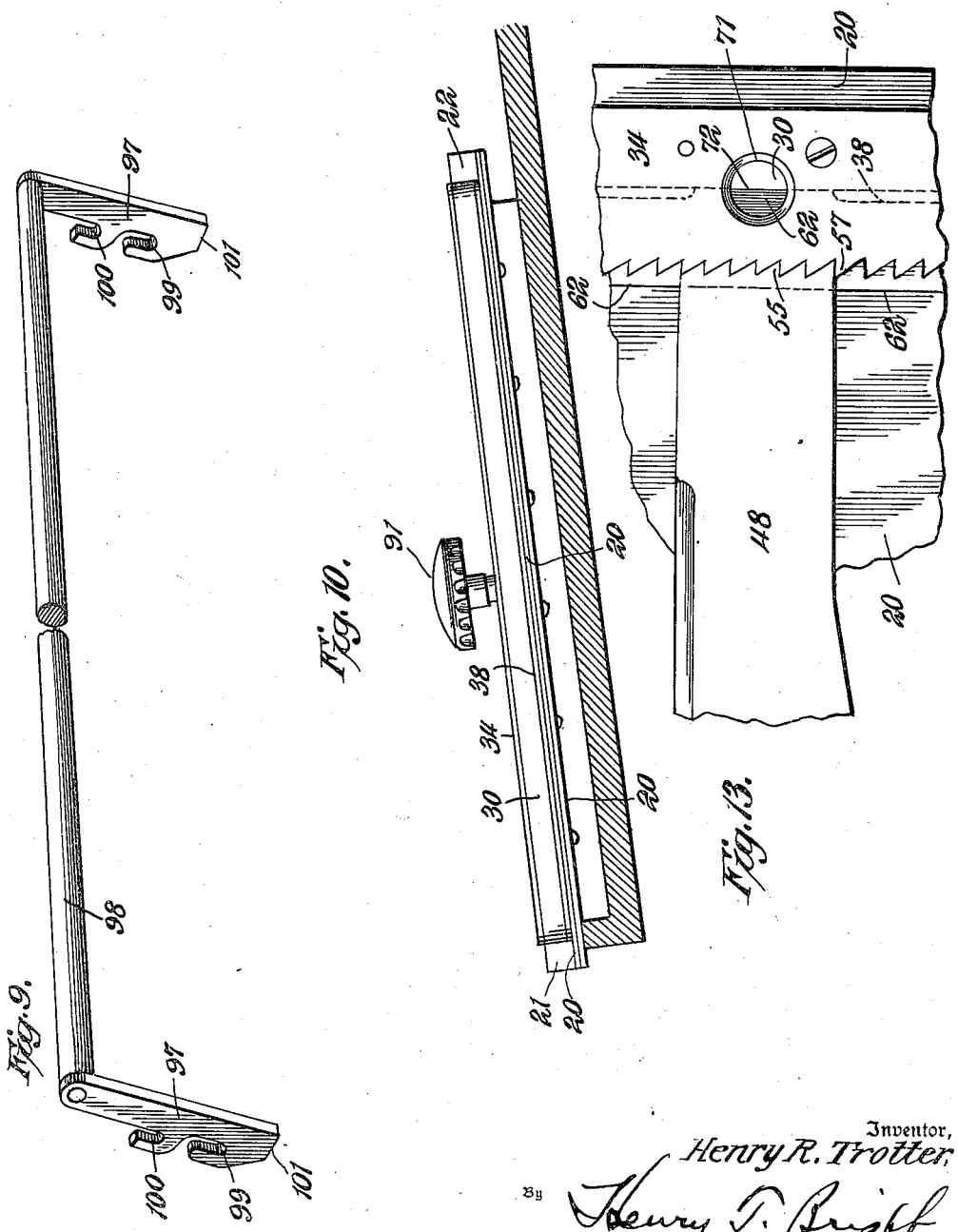
Inventor,
Henry R. Trotter,
By Henry T. Bright
Attorney Patented Apr. 19, 1938

2,114,946

UNITED STATES PATENT OFFICE 2,114,946

MAKE-UP GAUGE

Henry R. Trotter, Highland Park, Ill., assignor to Hacker Manufacturing Co., Chicago, Ill., a corporation of Illinois Application July 26, 1937, Serial No. 155,815

21 Claims. (Cl. 33—184.5)

My invention relates to make-up gauge for use in justifying type-page forms under lock-up pressure prior to the assembling of the forms in chase for transmission to the press.

It is the purpose of my present invention to produce a make-up gauge of the type specified which will be characterized by simplicity of structure and operation and the use of which will enable a compositor to attain form justification under lock-up pressure with great rapidity and accuracy.

I will describe my invention in the best form known to me at present but it will be apparent that the same is susceptible to changes in form with the exercise of only mechanical skill and without departing from the spirit thereof.

In the drawings chosen to illustrate my invention the scope whereof is set forth in the appended claims:

Figure 1 is a plan view of my improved make-up gauge with a type page form locked therein;

Figure 2, a side elevation of Figure 1 on an enlarged scale with the type page form removed and broken away intermediately;

Figures 3 and 3ª, illustrate an enlarged section on the line 3—3ª of Figure 6;

Figure 4, an enlarged section on the line 4—4 of Figure 1 with the type page form removed;

Figure 5, an enlarged plan view of my gauge broken away intermediately with the upper facing plates of the outer frame removed and the parts in the positions they would occupy when a justified form is fully released and ready to be removed to a galley;

Figure 6, a view similar to Figure 5 with the parts in the positions they would occupy when in full type page form locking position;

Figure 7, a side elevation of my gauge with the near side rail of the base plate partly removed and the gauge elevated at one end for the purpose of lift test;

Figure 8, a view similar to Figure 7 with one end of the gauge elevated to permit the removal of a tied justified form to a galley;

Figure 9, a perspective view of the lifting device used to selectively elevate one end of the gauge to either of the positions shown respectively in Figures 7 and 8;

Figure 10, an end view of the gauge with the latter shown supported on a compositor's bank, said bank being shown in section;

Figure 11, an enlarged section on the line 11—11 of Figure 6;

Figure 12, a detail view of the ball bearing device which is interposed between the locking cams and the outer frame; and Figure 13, an enlarged detail view showing the window through which the relative relation between the movable frame and the rigid frame can be observed, in this instance the movable frame is shown in contact with the rigid frame.

Referring particularly to the drawings my improved gauge is shown associated in Figures 1, 2, 3, 3ª and 4 with a base plate 20 which latter is provided at each side with corresponding upstanding rails 21 and 22 between which the gauge seats upon the plate 20. The rails 21 and 22 are provided respectively with corresponding notches 23 and 24 which respectively loosely receive pins 25 and 26 carried by the gauge to thereby provide a connection between the gauge and plate 20 which permits both pivotal movement of the gauge and prevents movement of the latter longitudinally of the plate, essential conditions during certain steps of form justification, as will hereinafter more fully appear.

Referring particularly to the detail construction of the gauge it will be noted that the same embodies a composite outer frame B and an inner frame C. As disclosed in Figures 1, 3—3ª, and 4, the outer frame B includes in detail an integral rectangular frame F having sides 27, 28, 29 and 30. Secured to the frame F are upper facing plates 31, 32, 33 and 34 and lower facing plates 35, 36, 37 and 38. The outer edges of these facing plates are all flush with the outer edges of the sides of the frame F but their inner edges are disposed a considerable distance inward of the inner edges of the sides of said frame to provide a space therebetween in which the inner frame C is disposed for limited movement with respect to the outer frame B. Anchored to and between the facing plates 32 and 36 against the side 27 and adjacent the side 28 is a block 39 having an angularly disposed portion 40. At the corner of the frame F formed by the sides 29 and 30 and between facing plates I secure to said sides respectively blocks 40' and 41 to provide a channel 42 which is diagonally alined with the portion 40 of the block 39. At the corner of the frame F formed by the sides 28 and 29 I secure to and between facing plates a block 43 having a beveled surface 44 parallel to the axis of the portion 40 of block 39. Likewise, at the corner of the frame F formed by the sides 27 and 30 I secure to and between facing plates a block 45 having a surface 46 parallel to the surface 44 of block 43, and also parallel to the common axis of the portion 40 of block 39 and the channel 42 formed by blocks 40' and 41.

Associated with the frame B are abutment bars 47 and 48. These bars are interleaved so that they can be moved with respect to one another for the purpose of relative adjustment. The bar 47 has its ends provided respectively with teeth 49 and 50, the teeth 49 being detachably engageable with the corresponding teeth 51 provided on the facing plate 31, while the teeth 50 are detachably engageable with corresponding teeth 52 formed on the facing plate 33. The teeth 51 and 52 are precisely formed for pica measurement and are positioned in opposed alinement. A numerical scale 53 is provided in association with each series of teeth 51 and 52 as a guide in the application of the toothed ends of the bar 47 into engagement with corresponding teeth of each series 51 and 52 and when so engaged the edge of the bar 47 opposite the facing plate 32 will be in a plane at right angles to the frame side 27. Likewise the bar 48 has its ends provided respectively with teeth 54 and 55 detachably engageable respectively with corresponding teeth 56 and 57, said teeth 56 being formed on the facing plate 32 and teeth 57 on the facing plate 34. A numerical scale 58 of pica measure is provided in association with each series of teeth 56 and 57 as a guide in the application of the toothed ends of bar 48 into engagement with corresponding teeth of each series 56 and 57 and when so engaged the edge of the abutment bar 48 opposite the facing plate 31 and the adjacent edge of the bar 47 will be disposed at right angles to each other and said edges will define one-half of the rectangular space which receives the type page form to be justified. It will be of course apparent that the size of such space can be varied as desired by shifting either or both of said bars along its related series of facing plate carried teeth and then reengaging the end teeth of the bars in the required facing plate teeth.

Referring now to the movable inner rectangular frame C it will be apparent that the same embodies sides 59, 60, 61 and 62, the sides 59 and 60 and the abutment bars 47 and 48 defining the complete rectangular space for receiving a type page form to be justified. The movement of the frame C from any form released position in the operation of applying lock-up pressure to a form to be justified is produced indirectly, that is to say, the moving force is applied initially to the side 60 in a direction at right angles thereto and means provided to translate that initially applied force into a force to move the frame C diagonally of both abutment bars 47 and 48 and at the same time maintain the frame sides 59 and 60 parallel at all times to the abutment bars 48 and 47 respectively. Stated a little differently, the form clamping movement of the frame C is such as to simultaneously vary in two directions the dimensional status of the rectangular form receiving space defined by the arms 59 and 60 and the abutment bars 47 and 48 and thereby impose the same lock-up pressure generated from a single source on two adjacent sides of the form. The means for effecting this movement of the frame C in response to lock-up pressure applied to the frame side 60 in a direction at right angles to the latter embodies a cam or wedging structure located at each corner of the frame C with the elementary cooperating portions of each cam or wedging structure carried respectively by the frames B and C. At the corner formed by the sides 59 and 60 the frame C is provided with a recess 63 in which the portion 40 of block 39 is slidably engaged. At the diagonally opposite corner of frame C formed by the sides 61 and 62 a projection 64 is provided, said projection being slidably engaged in channel 42 formed by blocks 40' and 41. This projection 64 is provided with a longitudinal recess 65 opening through its free end. Axially alined with this recess is a passage 66 bored in the frame F. The outer end of the passage 66 is closed by a plug 67 threaded therein. A spring 68 is disposed in said recess 65 and passage 66 and reacts from the plug 67 to restore the frame C to normal position as lock-up pressure is decreased on the side 60. At the corner of the frame C formed by sides 60 and 61 I provide a cam or wedging surface 69 which cooperates with the surface 44 of block 43 and at the corner formed by the sides 59 and 62 I provide a cam or wedging surface 70 which cooperates with the surface 46 of block 45. As a result of the provision of these cooperating cam or wedging surfaces at the various corners of the frame C, as just described, it will be apparent that when a lock-up force is applied to the side 60 at right angles thereto the cooperating cam or wedging surfaces will coact to translate said force into a force to move the frame C in a direction oblique both abutment bars 47 and 48. In addition, said cooperating cam or wedging surfaces serve to maintain the sides 59 and 60 in parallelism at all times with the abutment bars 48 and 47 respectively.

In order that the compositor may be informed when lock-up pressure is applied to the side 60, whether the rectangular form receiving space defined by the sides 59, 60 and the abutment bars 47, 48 possesses a predetermined dimensional status, I provide in the facing plate 34 a circular opening or window 71 which is approximately bisected by the inner edge of the frame side 30 as shown at 72 (see Figure 13). As the frame C is moved in a form clamping direction the outer edge of the frame side 62 will eventually come into contact with the edge 72, such contact being visible through the opening 71 and thereby informing the compositor that the form receiving rectangular space defined by sides 59, 60 and abutment bars 47 and 48 possesses the predetermined dimensional status required for proper justification of the particular form in hand. On the other hand, if, after full lock-up pressure has been applied to side 60, observation through the opening 71 shows the presence of a gap between the edge 72 of side 30 of frame F and the outer edge of side 62 of frame C the compositor is informed that the form being justified is oversize and needs correction in that respect.

In applying lock-up pressure or force to the side 60 of frame C I employ a beam 73 which is secured to side 60 by means of headed screws 74, the construction being such that the beam can partake of limited movement toward and away from the side 60. Formed in beam 73 is a plurality of recesses 75 which open through the face of the beam opposite the side 60 of frame C. Seated in each recess 75 is a spring 76. Said springs 76, as will be apparent, normally hold the beam at the limit of its movement away from the frame side 60 and transform said beam into a yielding pressure or force transmitting member. I further provide the beam 73 with recesses 77 which open through the face of the beam remote from the frame side 60. Rotatably mounted in each recess 77 is a cam follower 78 constituted preferably by a ball bearing. It will be noted that the beam 73 and all parts carried thereby are located between the facing plates 32 and 36. The cam followers 78 project outside their related recesses and are in operative engagement respectively with mutually connected cam members 79 and 80. Each cam member 79 and 80 includes a cam surface 81 and a locking surface 82 over which the related follower successively travels in the operation of applying lock-up pressure to frame side 60; the locking surfaces 82 being parallel to the direction of movement of the cam members and the surfaces 81 at an inclination to said direction. As will be apparent the cam members 79 and 80 during the application and release of lock-up pressure, reciprocate in a direction parallel to the beam 73 and during such reciprocation all reactive force imposed upon the cam members is sustained by the side 28 of frame F said force being transmitted thereto through a ball bearing assembly interposed between said side and the mutually connected cam members. This assembly comprises a ball retainer bar 83 loosely resting on the facing plate 36 and having angular ends 84 between which latter is retained a series of ball bearings 85 to diminish frictional resistance to movement of the cam members. Stops 86 are carried by the cam members to limit their movement independently of the bar 83 and balls 85 beyond a predetermined amount. In order to manually reciprocate the mutually connected cam members 79 and 80 to lock-up and release a form in and from the gauge I mount on the mutual connection between the cam members 79 and 80 a rack 87 and engage with said rack a pinion 88 whose end portions are reduced and rotatably engaged respectively in the facing plates 32 and 36. This pinion is provided with an axial passage 89 of square cross section to detachably receive a correspondingly shaped portion 90 of the stem of an operating knob 91, whereby said knob may be connected with and disconnected from said pinion as desired. To prevent the knob 91 from spinning or "running away" under the influence of the restoring spring 68 and the pressure transmitting springs 76, when the pressure load is released, I provide a friction drag for the mutually connected cam members 79 and 80. Such a drag is associated with each cam member by providing a stepped recess having an outer portion 92 of major diameter and an inner portion 93 of minor diameter. Seated in the portion 93 is a spring 94 which constantly urges a friction block 95 in the portion 92 into frictional engagement with the inner surface of the facing plate 32.

The use of my improved gauge requires that means be provided for selectively lifting and holding the end of the gauge limited by the frame side 23 to and in either of two elevations, one of said elevations being required to subject the form being justified to lift test and the other to permit removal of a tied justified form to a galley. To this end I provide the gauge at the end thereof to be lifted with laterally directed fulcrum pins 96 for cooperation with a lifting device comprising side arms 97 mutually connected by a handle 98. Each of the arms 97 embodies formations providing spaced apart notches 99 and 100, said notches opening toward the handle 98. The free end of each arm 97 is formed by a flat surface 101 extending at an angle to the longitudinal axis of the arm and serving as a means to hold the related end of the gauge in elevation.

In use my improved gauge and its supporting plate 20 are placed upon the compositor's bank with the pins 25 and 26 engaged respectively in notches 23 and 24, the mutually connected cam members 79 and 80 in full form unlocked position, (see Figure 5) the abutment bars adjusted to the predetermined size of the form to be made up, and the lifting device positioned as shown in Figure 2 with the pins 96 engaged in notches 99 respectively. The compositor then builds up the form in the rectangular space defined by abutment bars 47, 48 and the adjacent sides 59 and 60 of frame C. When the form has been built up justification thereof is proceeded with and finally accomplished in the following manner. The compositor rotates the knob 91 to the left and thereby moves the mutually connected cam members from the position shown in Figure 5 to the position shown in Figure 6 and applies lock-up force to the side 60 of frame C through the beam 73 and springs 76 in a direction at right angles to said side. In the manner I have previously described the lock-up force applied to the frame side 60 is translated into a force to move the frame C diagonally of both abutment bars with parallelism between the frame sides 59, 60 and their opposed abutment bars 48, 47 maintained at all times. The compositor then observes the positional relation between adjacent edges of the frame F and frame C through opening 71 and, as has been previously pointed out, if there is a gap between said edges the form is oversize and must be reduced in size until the edges of the frames F and C observable through opening 71 are in contact when lock-up force is applied. With such contact established the compositor then resorts to a lift test of the form by grasping the handle 98 and operating the arms 97 to the position shown in Figure 7. Should this test show looseness in the form at a point or points therein the form is not square and must be corrected to relieve that condition. Should this lift test or a subsequent similar test show no looseness in the form make-up such form must be square and of proper size due to the fact that the arms 59 and 60 provide a rigid right angle as do likewise the abutment bars 47 and 48.

After justification as to size and squareness is thus established the raised end of the gauge is lowered by returning the lifting device to the position shown in Figure 2. With the justified form still under lock-up pressure said form is tied up by the compositor in the usual manner. The form is then released and the lifting device shifted to engage the pins 96 in respective notches 100. By then fulcruming the arms 97 on the pins 96 through the instrumentality of handle 98 to the position shown in Figure 8 the related end of the gauge will be elevated sufficiently to permit the tied justified form to be slid from the base plate 20 on to a galley.

What I claim is:

1. In a type page form make-up gauge, two fixed abutments disposed at right angles to each other, a movable member having fixedly connected arms in right angular relation to each other and opposed respectively to the abutments, and means to move said member to simultaneously vary the distance between each arm thereof and its opposed abutment and maintain each arm of said member in parallelism with its opposed abutment at all times.

2. In a type page form make-up gauge, two fixed abutments disposed at right angles to each other, a movable member having fixedly connected arms at right angles to one another and opposed respectively to the abutments, means to move said member to simultaneously vary the distance between each arm thereof and its opposed abutment and maintain each arm of said member in parallelism with its opposed abutment at all times, and means whereby the fixed operative positions of the abutments may be selectively varied.

3. In a type page form make-up gauge, two fixed abutments at right angles to each other, a movable member having fixedly connected arms in right angular relation and opposed respectively to the abutments, means for exerting a force against one arm of the member, and means to translate said force into a force to move the member obliquely with respect to both abutments and maintain each arm of the member in parallelism with its opposed abutment at all times.

4. In a type page form make-up gauge, an outer rectangular frame, an inner rectangular frame having limited movement within the outer frame, abutment bars carried by the outer frame and disposed at right angles to each other, means to move the inner frame in a direction oblique both abutment bars and to maintain each side of the inner frame parallel at all times with the abutment bar which extends in the same direction as said side.

5. In a type page form make-up gauge, an outer rectangular frame, an inner rectangular frame having limited movement within the outer frame, abutment bars carried by the outer frame and disposed at right angles to each other, means to move the inner frame in a direction oblique both abutment bars and to maintain each side of the inner frame parallel at all times with the abutment bar which extends in the same direction as said side, said means including interfitting slidable connections between the frames.

6. In a type page form make-up gauge, an outer rectangular frame, an inner rectangular frame having limited movement within the outer frame, abutment bars carried by the outer frame at right angles to each other, means to exert a force against a side of the inner frame in a direction at right angles to said side, and means to translate said force into a force to move the inner frame in a direction oblique both abutment bars and to maintain each side of the inner frame parallel at all times with the abutment bar which extends in the same direction as said side.

7. In a type page form make-up gauge, an outer rectangular frame, an inner rectangular frame having limited movement within the outer frame, abutment bars carried by the outer frame at right angles to each other, means to exert a force against a side of the inner frame in a direction at right angles to said side, and cooperating cam surfaces carried by the frames operable to translate said force into a force to move the inner frame in a direction oblique both abutment bars and to maintain each side of the inner frame parallel at all times with the abutment bar which extends in the same direction as said side.

8. In a type page form make-up gauge, an outer rectangular frame, an inner rectangular frame having limited movement within the outer frame, abutment bars carried by the outer frame and disposed at right angles to each other, means to move the inner frame from normal position in a direction oblique both abutment bars and to maintain each side of the inner frame parallel at all times with the abutment bar which extends in the same direction as said side, and means for restoring the inner frame to normal position when the influence of said moving means is removed.

9. In a type page form make-up gauge, an outer rectangular frame, an inner rectangular frame having limited movement within the outer frame, abutment bars carried by the outer frame and disposed at right angles to each other, means to move the inner frame from normal position in a direction oblique both abutment bars and to maintain each side of the inner frame parallel at all times with the abutment bar which extends in the same direction as said side, and spring means to restore the inner frame to normal position when the influence of said moving means is removed.

10. In a type page form make-up gauge, an outer rectangular frame, an inner rectangular frame having limited movement within the outer frame, abutment bars carried by the outer frame and disposed at right angles to each other, a cam bar carried by the outer frame reciprocable in a direction parallel to the adjacent side of the inner frame, means to reciprocate said cam bar, means between the adjacent frame side and the cam bar whereby movement of the cam bar in one direction will produce a force against the adjacent side of the inner frame in a direction at right angles to said side, and means to translate said force into a force to move the inner frame obliquely to both abutment bars and to maintain each side of the inner frame parallel at all times with the abutment bar which extends in the same direction as said side.

11. In a type page form make-up gauge, an outer rectangular frame, an inner rectangular frame having limited movement within the outer frame, abutment bars carried by the outer frame and disposed at right angles to each other, a cam bar carried by the outer frame and reciprocable in a direction parallel to the adjacent side of the inner frame, means to reciprocate said cam bar, a beam carried by the said adjacent inner frame side for limited movement toward and away from the same, springs interposed between the beam and adjacent frame side normally holding the beam at the limit of its movement away from the adjacent frame side, followers carried by the beam and coacting with the cam bar during movement of the latter in one direction to apply a force against said adjacent frame side through said springs in a direction at right angles to the adjacent frame side, and means to translate said force into a force to move the inner frame obliquely to both abutment bars and to maintain each side of the inner frame parallel at all times with the abutment bar which extends in the same direction as said side.

12. In a type page form make-up gauge, an outer rectangular frame, an inner rectangular frame having limited movement within the outer frame, abutment bars carried by the outer frame and disposed at right angles to each other, a cam bar carried by the outer frame reciprocable in a direction parallel to the adjacent side of the inner frame, a rack included in said cam bar, a manually rotatable pinion meshing with the rack operable by its rotation to reciprocate the cam bar, means between the adjacent frame side and the cam bar, whereby movement of the cam bar in one direction will exert a force against the adjacent side of the inner frame in a direction at right angles to said side, and means to translate said force into a force to move the inner frame obliquely to both abutment bars and to maintain each side of the inner frame parallel at all times with the abutment which extends in the same direction as said side.

13. In a type page form make-up gauge, two fixed abutments disposed at right angles to each other, a movable member having fixedly connected arms in right angular relation and opposed respectively to the abutments, cam operated means to exert a force against one arm of the member in the direction of its other arm, and means to translate said force into a force to move the member obliquely with respect to both abutments and maintain each arm of the member in parallelism with its opposed abutment at all times.

14. In a type page form make-up gauge, fixed and movable structures each including relatively fixed arms in right angular relation to each other with the arms of one structure opposed respectively to the corresponding arms of the other, means to exert a force against an arm of the movable structure in the direction of the other arm of said structure, and means to translate said force into a force to move said structure obliquely with respect to both arms of the fixed structure and maintain the opposed arms of the structures parallel at all times.

15. In a type page form make-up gauge, fixed and movable structures, each including relatively fixed arms in right angular relation to each other with the arms of one structure opposed respectively to the corresponding arms of the other, whereby said structures define a rectangular type page form receiving space, means for moving the movable structure to simultaneously vary the dimensional status of said space in two directions while maintaining said opposed arms parallel at all times, and means to indicate when said rectangular space possesses a predetermined dimensional status.

16. In a type page form make-up gauge, fixed and movable structures each including relatively fixed arms in right angular relation to each other with the arms of one structure opposed respectively to the corresponding arms of the other, whereby said structures define a rectangular type page form receiving space, means for moving the movable structure to simultaneously vary the dimensional status of said space in two directions while maintaining said opposed arms parallel at all times, and means limiting the movement of said structure when said space possesses a predetermined dimensional status.

17. In a type page form make-up gauge, an outer rectangular frame, an inner rectangular frame movable with respect to the outer frame, abutment bars carried by the outer frame disposed at right angles to each other and in opposition to adjacent sides of the inner frame to provide a rectangular type page form receiving space, means for moving the inner frame to simultaneously vary the dimensional status of said space in two directions while maintaining at all times parallelism between the abutment bars and their opposed frame side, and means to indicate when said rectangular space possesses a predetermined dimensional status.

18. In a type page form make-up gauge, an outer rectangular frame, an inner rectangular frame movable with respect to the outer frame, abutment bars carried by the outer frame disposed at right angles to each other and in opposition to adjacent sides of the inner frame to provide a rectangular type page form receiving space, means for moving the inner frame to simultaneously vary the dimensional status of said space in two directions while maintaining at all times parallelism between the abutment bars and their opposed frame side, and means limiting movement of said inner frame when said space possesses a predetermined dimensional status.

19. In combination, a base member, a type page form make-up gauge disposed upon the base member and having one end in pivotal connection with the latter, said gauge including means to clamp therein a type page form disposed upon the base member, means to raise and hold the other end of the gauge to and in one elevation for lift test of a form clamped in the gauge, and means to raise and hold said other end of the gauge to and in another elevation to permit removal of a form when released from the gauge, both of said gauge raising means including the same operating handle.

20. In combination, a base plate provided with upstanding side rails, having corresponding notches therein, a type page form make-up gauge disposed upon the base plate between the rails, pins carried by the gauge at one end and loosely engaged respectively in said notches to provide a pivotal mounting for the gauge, and means to raise and hold the other end of the gauge in elevation.

21. In combination, a base member, a type page form make-up gauge disposed upon the base member and having one end in pivotal connection with the latter, a laterally directed pin carried by the other end of the gauge on each side thereof, and a gauge lifting device comprising duplicate arms mutually connected at corresponding ends by a handle, each of said arms having a flat free end and formations providing spaced apart notches, the corresponding notches of the arms being selectively and simultaneously engageable with said pins respectively whereby the fulcruming of the arms on said pins will raise and hold the related end of the gauge in elevation.

HENRY R. TROTTER.